(12) United States Patent
Arie

(10) Patent No.: US 10,414,205 B2
(45) Date of Patent: Sep. 17, 2019

(54) TEMPORARY TATTOO

(71) Applicant: Ataraxia Creative Hands Inc, Hollywood, FL (US)

(72) Inventor: Tomer Arie, Hollywood, FL (US)

(73) Assignee: Ataraxia Creative Hands, Inc, Hollywood, FL (US)

( * ) Notice: Subject to any disclaimer, the term of this patent is extended or adjusted under 35 U.S.C. 154(b) by 331 days.

(21) Appl. No.: 15/428,048

(22) Filed: Feb. 8, 2017

(65) Prior Publication Data

US 2018/0222248 A1    Aug. 9, 2018

(51) Int. Cl.
| | | |
|---|---|---|
| *B44C 1/00* | (2006.01) |
| *B32B 7/00* | (2019.01) |
| *B32B 37/00* | (2006.01) |
| *A61F 13/00* | (2006.01) |
| *B44C 1/175* | (2006.01) |
| *B32B 7/12* | (2006.01) |
| *B32B 37/12* | (2006.01) |

(52) U.S. Cl.
CPC ............ *B44C 1/1758* (2013.01); *B32B 7/12* (2013.01); *B32B 37/12* (2013.01); *B32B 2451/00* (2013.01)

(58) Field of Classification Search
CPC .... B44C 1/00; B44C 1/10; B44C 1/17; B44C 1/175; B44C 1/1758; B32B 7/00; B32B 7/10; B32B 7/12; B32B 37/00; B32B 37/10; B32B 37/12; A61F 13/00; A61F 13/02
See application file for complete search history.

(56) References Cited

U.S. PATENT DOCUMENTS

| | | | |
|---|---|---|---|
| 6,074,721 A * | 6/2000 | Moore ...................... | B41M 3/12 156/89.11 |
| 6,106,852 A | 8/2000 | Vineberg | |
| 6,264,786 B1 | 7/2001 | Cromett | |
| 7,988,199 B2 | 8/2011 | Welsh | |
| 2006/0154031 A1 * | 7/2006 | Tomlinson ............ | B44C 1/1733 428/195.1 |
| 2012/0037291 A1 * | 2/2012 | Goolishian ........... | B44C 1/1758 156/62 |
| 2013/0153133 A1 | 6/2013 | Kane | |

* cited by examiner

*Primary Examiner* — Jacob T Minskey
*Assistant Examiner* — Matthew Hoover
(74) *Attorney, Agent, or Firm* — Christopher J. Vandam, PA; Chris Vandam

(57) ABSTRACT

A method of making a temporary tattoo that in one embodiment art is placed onto a non-stick panel. An absorbent layer with an adhesive side down is placed over the art where the adhesive sticks to both the art and the non-stick panel. An impermeable layer with an adhesive side is stuck completely over the art and at least partially covering the absorbent layer. The then combined art stuck to the absorbent layer in turn stuck to the impermeable layer is removed from the non-stick panel and is placed on the skin for a predetermined period of time while the art is transferred onto the skin using only skin generated moisture captured in the absorbent layer by the impermeable layer.

3 Claims, 2 Drawing Sheets

| 24 - IMPERMEABLE LAYER |
| :---: |
| 26 - ABSORBENT LAYER |
| 28 - PERMEABLE LAYER |
| 30 - PERMEABLE LAYER |
| 32 - INK/ART |

Fig. 4

| 34 - IMPERMEABLE LAYER |
| :---: |
| 36 - INK/ART |

Fig. 5

TEMPORARY TATTOO

BACKGROUND OF THE INVENTION

1. Field of the Invention

The present invention relates to body art, and more particularly, to a temporary tattoo and method of making a temporary tattoo.

2. Description of the Related Art

Several designs for tattoo have been designed in the past. None of them, however, includes features and methods for making and using a temporary tattoo where, in at least one embodiment, artwork is placed on a non-stick panel then covered by a permeable layer with adhesive against the artwork and then partially covered by an impermeable layer to use the wearer's body heat and moisture to transfer the artwork onto the skin of the wearer.

Applicant believes that a relevant prior art reference corresponds to U.S. patent publication No. 2012/0037291 filed by Goolishian. However, it differs from the present invention because, among several differences, Goolishian uses several vinyl-acrylic copolymers known in the art form as aqueous solutions that can be applied to the film selectively so that no adhesive is deposited in the film-voids.

Other prior art use a variety of primer compounds and mechanical printing on paper in an attempt to improve a temporary tattoo. The present design that, among other things, allows an artist or machine to apply a detailed and multi-feature design on a non-stick panel that allows a wider variety of high quality temporary art to be applied to the skin of the tattooed.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a temporary tattoo method of manufacture and use with a higher degree of precision transfer detail.

It is another object of this invention to provide a temporary tattoo device that allows a highly detailed artwork to be transferred to the wearers skin preserving the details.

It is still another object of the present invention to provide a temporary tattoo and method of making and using that is safe to both the manufacturer and wearer of the tattoo.

It is another object of the invention to allow an easy method of applying a tattoo to the body.

Another object of the present invention to allow a new way of transferring ink to the body.

It is yet another object of this invention to provide such a device and method that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is shows an elevation view of an example of layers of a temporary tattoo.

FIG. 5 is an elevation view of an example of layers of a temporary tattoo.

DETAILED DESCRIPTION OF THE PREFERRED EMBODIMENT

Figure 1:
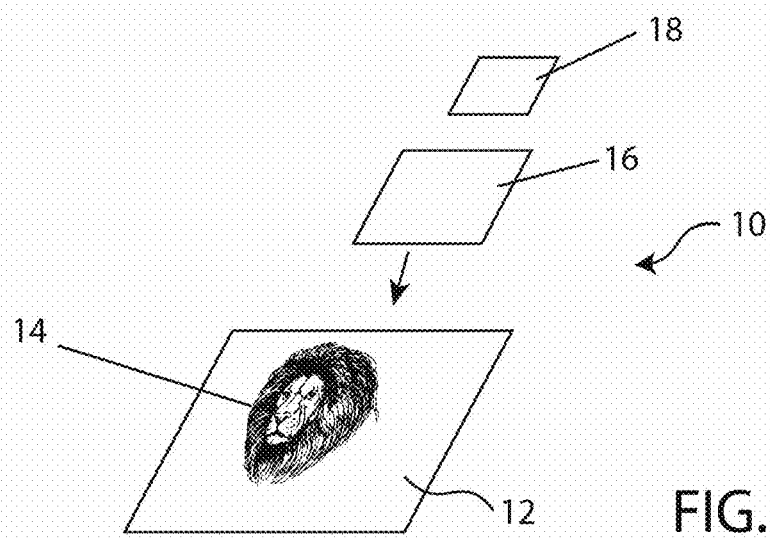
FIG. 1 shows a perspective exploded view of the layers of a version of a temporary tattoo.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, tattoo, temporary tattoo, layers, laminations, layup, system, method, machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a panel 12, an art 14, a layer 16, a layer 18, a skin 20 and a backing 22.

In one embodiment of the present invention a panel 12 with a non-stick upper surface is prepared. Generally, the panel 12 will be rigid and sufficiently sized to allow the preselected art 14 to fit on the upper, non-stick surface of the panel 12.

In one version of the invention the panel 12 is a rigid member, such as a board or sheet metal with a non-stick coating on the upper surface. The rigidity of the panel 12 is not critical as it can be supported by other surfaces, such as a printer bed, table top or other supporting structure upon which it is placed during preparation of the device for creation of a temporary tattoo.

The non-stick nature of the upper surface of the panel 12 may be effected by creating the panel out of, or coating the upper surface with, a substance that resists the penetration and adhesion of the tattoo art 14 from which the art 14 is drawn onto the panel 12. For example, PTFE (polytetrafluoroethylene), sold under the tradename Teflon®, or related material FEP (fluorinated ethylene propylene) may be effectively employed as a non-stick coating.

Other materials used for the surface of the panel 12 may be comprised of other polymers, such as HDPE (high density polyethylene) or silicone. Liquid-impregnated surface materials such as LiquiGlide® can also be used as a surface coating of the panel 12. Nanotechnology also offers some solutions for non-stick coatings that would also be effective as a work surface on the panel 12.

Referring again to FIG. 1, the process of creating a temporary tattoo is demonstrated. The panel 12 is placed with the non-stick surface available for application of art 14. The art 14 can be applied to the non-stick surface of the panel 12 by a wide variety of methods. In the more manual range of art 14 creation the art 14 is drawn by hand by an artist using a brush, pen, marker or other art medium or means that can transfer on the panel 12 a predefined art 14.

The art 14 may be made from ink, stain, dye, toner or other colorant that can be applied to the non-stick panel 12 and be carried by the layer 16 and also be absorbed onto the skin 20 to create an image on the skin. Ink is used interchangeably with the other terms to refer to the art 14. Some temporary tattoo art or ink is made from plant extracts, momentary ink, synthetic and natural compounds in a wide variety of commercially available and home prepared proprietary formulations for tattoos.

Other means of placing the art 14 onto the surface of the panel 12 may include differing degrees of mechanical involvement. For example, two dimensional (2-D) and three dimensional (3-D) printers can be adapted to deposit the art 14 onto the panel 12.

Silk screen or stenciling can also be used to create part or all of the art 14. These types of technologies have drawbacks in that bridging may be required for more intricate designs. Some elements of the stencil or silk screen may need supportive bridging to achieve details or shapes that are necessary to the artist's desired art 14. This can be corrected with manual overpainting to cover the bridges.

Still referring to the version of the temporary tattoo shown in FIG. 1, once the art 14 is applied to the upper surface of the panel 12 the layer 16 is placed over and covering the entirety of the art 14. The layer 16 has a thin layer of adhesive applied to the underside where the layer 16 is pressed against the panel 12. The layer 18 is then applied onto the layer 16 over the art 14. The underside of the layer 18 includes a thin layer of adhesive applied to the underside where layer 18 is pressed onto the top side of the layer 16.

The layer 16 in this version of the invention is permeable. A non-woven tape-like material that allows the passage of some body moisture has been found to be effective. The adhesive on the bottom side of the layer 16 also should be adapted to allow the passage of some moisture when applied to the skin. Layer 16 may be provided in tape or sheet format that can be trimmed to proper size during the process of creating the temporary tattoo.

The layer 18, also in this version of the invention, is impermeable. A plastic or coated paper can be effective. Layer 18 has a thin adhesive layer on the bottom side to adhere to the upper side of layer 16. Layer 18 may be provided in tape or sheet format that can be trimmed to the proper size. Layer 18 can act to reflect or trap body moisture to keep the environment under layer 18 humid. The dimensions of layer 18 may be smaller than the dimensions of layer 16 to keep the moisture to the most effective level for transferring the art 12 onto the skin 20. The dimensions of the layer 16 and layer 18 can be materially similar.

Looking at FIGS. 2 and 3, layer 16 should extend beyond the edge of the art 14 so that some of the adhesive on the bottom side is exposed around the periphery of the art 14 and the layer 16 with the art 14 below is held against the skin 20. The layer 18 acts as a cover or humidity barrier to keep the art 14 at the proper moisture level against the skin 20 to allow the art 14 to transfer to the skin over a predetermined period of time that temporary tattoo is worn during the transfer process prior to exposing the art 14 then transferred to the skin 20.

The art adheres to the adhesive on the underside of layer 16 more than to the non-stick panel 12 so the art 14 will remain with the layer 16. After the temporary tattoo is assembled by adhering layer 16 over the art 14 and then layer 18 over the art and adhered to layer 16 the combination of layers 16 and 18 with the art 14 coming off the panel 12 adhered to the bottom of layer 16. The art 14, now transferred from the panel 12 to the bottom of layer 16, can be protected prior to application to the skin 20 by applying a removable backing 22. The backing 22 can be peeled off immediately prior to use, leaving the art 14 affixed to the bottom of layer 16.

Figure 2:
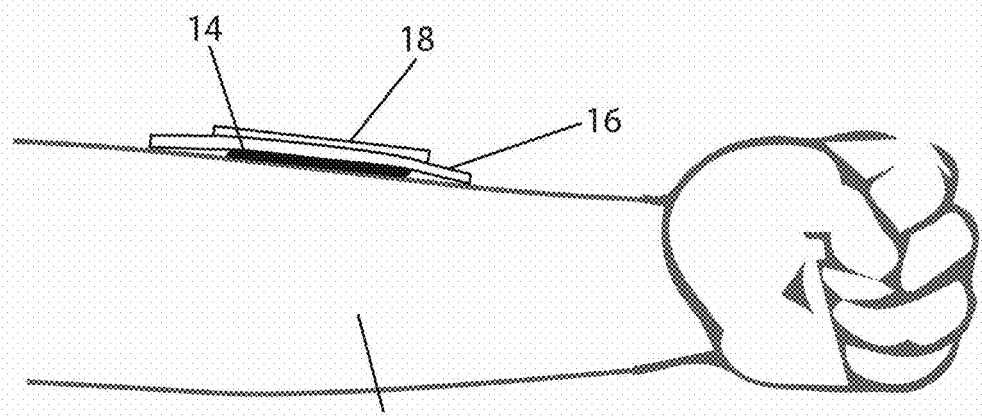
FIG. 2 shows an elevation view of a temporary tattoo applied to a human arm.
Figure 3:
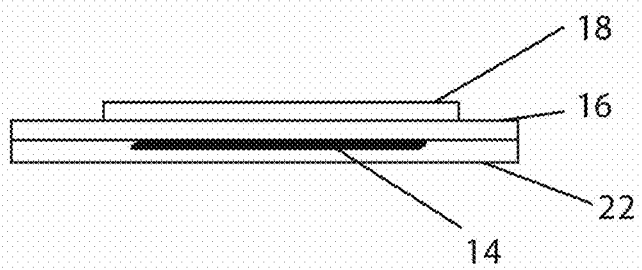
FIG. 3 shows an elevation view detail of a version of a temporary tattoo.

FIG. 2 shows the temporary tattoo in the process of being applied to the skin 20 of a wearer. The backing 22, if used, has been removed and the adhesive on the bottom of layer 16 is stuck to the skin 20. The layer 18 captures some perspiration from the skin 20. The layer 16 can retain some of the moisture from the body and use it to wick or transfer the ink of the art 14 to the skin.

Depending on the nature of the ink (or other colorant as noted above), the nature of the skin 20, the humidity of the environment, size of the art 14 and specific materials of the layers 16 and 18, the time the temporary tattoo is on the skin during the transfer process (seen in FIG. 2) for from several minutes to several hours or overnight. During the application process it may be preferred to not participate in activity that could cause profuse sweating. The normal resting rate of skin 20 perspiration is ideally sufficient in light of the materials used to fabricate the temporary tattoo.

FIG. 4 shows an example of an alternate configuration including several layers forming a temporary tattoo comprising an impermeable layer 24, an absorbent layer 26, a permeable layer 28, a permeable layer 30 and art 32.

The process of creating the art 32 on a non-stick panel 12 remains similar to the processes described above. Once the art 32 is on the panel 12 the permeable layer 30 is placed adhesive side down, covering the art 32 and against the panel 12. Another permeable layer 28 is laid over the layer 30 and also covers the art 32. The permeable layers 28 and 30 primarily allow body moisture to wick through and may retain a small amount of perspiration. The absorbent layer 26 is placed above the permeable layer 28 and acts to retain perspiration away from the skin 20 and away from direct interaction with the art 32. Permeable layer 30 may be absent in some embodiments. An impermeable layer 24 is the upper-most cover of the temporary tattoo.

Each of the layers 24, 26, 28 and 30 may be constructed of sheet material with a thin adhesive coating to allow it to adhere to the subsequent layer. The adhesive and layer may take the form of a sheet or roll (similar to a roll of tape) that is pre-sized or custom cut when making the tattoo. The adhesive should be sufficient to adhere to the skin 20 and also release when needed. The characteristics of each of the layers has an analog in medical tapes.

The impermeable layer 24 may be a plastic or other polymer that does not permit the transference of moisture through itself. The impermeable layer traps some moisture and protects the other layers when applied to the skin 20.

The absorbent layer 26 may be slightly thicker than the other layers. Fabric, cotton, natural, synthetic, silica, spun polypropylene or other material that can hold some moisture is preferred and will also have a lower side with adhesive to stick to the permeable layer 28.

The permeable layers 28 and 30 are a barrier between the art 32 and the absorbent layer 26. The permeable layers 28 and 30 may be constructed of a perforated polymer, non-woven fabric or other similarly performing material that does not retain substantial volumes of perspiration yet allow that moisture to readily pass through.

The term permeable also may be characterized as a breathable layer. Permeable should allow the transition of moisture through it without substantial retention. Permeable layers 28 and 30 act to keep substantial moisture from direct interaction with the art 32 on the skin 20 of the wearer during application to the skin 20.

FIG. 5 is another variety of temporary tattoo comprising simply an impermeable layer 34 and art 36. As like the other versions described herein, art 36 is placed on the non-stick panel 12. The impermeable layer 34 has an adhesive bottom side that is placed over the art 36 on the panel 12. The art 36 adheres to the bottom side of the layer 34 and is removed from the panel 12 with layer 34. The impermeable layer 34 is larger than the art 34 so that around the art 36 is adhesive that is used to stick the layer 34 with the art 36 down against the skin to transfer the art 36 to the skin 20 of the wearer.

Permeable layers may have a degree of absorbency. An absorbent layer will also have a degree of permeability. The permeable layer is focused more on permeability. The absorbent layer will prize absorbency. The terms are sometimes used interchangeably.

One version of the invention can be fairly described as a process for making an temporary tattoo comprised of imposing or placing an art upon a surface of a non-stick panel. A permeable layer is completely covered on a bottom surface with adhesive. An impermeable layer is completely covered on a bottom surface with adhesive. Completely covering the art with the permeable layer having the adhesive against the art so that the art adheres to the permeable layer. Completely covering the art with the impermeable layer having the adhesive against the permeable layer so that the impermeable layer adheres to the permeable layer. Then removing the combined art, permeable layer and impermeable layer from the non-stick panel. Placing the adhesive of the permeable layer against a skin so the art is against the skin and the adhesive adheres to the skin for a predetermined length of time. Without adding any additional liquid a perspiration from the skin is held in the permeable layer. The moisture held by the permeable layer carries the art onto the skin where the art is absorbed onto the skin resulting in a temporary tattoo.

A related version of the inventive concept can be fairly described as a process for making an temporary tattoo comprised of imposing an art upon a surface of a non-stick panel. An impermeable layer is completely covered on a bottom surface with adhesive. Completely covering the art with the impermeable layer having the adhesive against the art so that the art adheres to the impermeable layer. Removing the combined art and impermeable layer from the non-stick panel. Placing the adhesive of the impermeable layer against a skin so the art is against the skin and the adhesive adheres to the skin for a predetermined length of time. Without adding any additional liquid a perspiration from the skin is held in the absorbent layer. The moisture trapped against the skin by the impermeable layer carries the art onto the skin where the art is absorbed onto the skin resulting in a temporary tattoo.

Yet another version of the inventive concept can be fairly described as a process for making an temporary tattoo comprised of imposing an art upon a surface of a non-stick panel. A first permeable layer is completely covered on a bottom surface with adhesive. A second permeable layer is completely covered on a bottom surface with adhesive. An absorbent layer is completely covered on a bottom surface with adhesive. An impermeable layer is completely covered on a bottom surface with adhesive. Completely covering the art with the first permeable layer having the adhesive against the art so that the art adheres to the first permeable layer. Completely covering the art with the second permeable layer having the adhesive against the first permeable layer so that the second permeable layer adheres to the first permeable layer. Completely covering the art with the absorbent layer having the adhesive against the second permeable layer so that the absorbent layer adheres to the second permeable layer. Completely covering the art with the impermeable layer having the adhesive against the absorbent layer so that the impermeable layer adheres to the absorbent layer. Removing the combined art, first permeable layer, second permeable layer, absorbent layer and impermeable layer from the non-stick panel. Placing the adhesive of the first permeable layer against a skin so the art is against the skin and the adhesive adheres to the skin for a predetermined length of time. Without adding any additional liquid a perspiration from the skin can pass through the first permeable layer and second permeable layer and is held in the absorbent layer. The moisture held by the absorbent layer carries the art onto the skin where the art is absorbed onto the skin resulting in a temporary tattoo.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for making a temporary tattoo comprised of:
   imposing an art upon a surface of a non-stick panel;
   a permeable layer is completely covered on a bottom surface with a first adhesive;
   an impermeable layer is completely covered on a bottom surface with a second adhesive;
   completely covering the art with the permeable layer having the first adhesive against the art so that the art adheres to the permeable layer;
   completely covering the art with the impermeable layer having the second adhesive against the permeable layer so that the impermeable layer adheres to the permeable layer;
   removing the art, permeable layer and impermeable layer from the non-stick panel;
   placing the first adhesive of the permeable layer against a skin so the art is against the skin and the first adhesive adheres to the skin around the art for a predetermined length of time;
   without adding any additional liquid, a perspiration from the skin is held in the permeable layer;

the perspiration held by the permeable layer carries the art onto the skin where the art is absorbed onto the skin resulting in the temporary tattoo.

2. A process for making a temporary tattoo comprised of:

imposing an art upon a surface of a non-stick panel;

an impermeable layer is completely covered on a bottom surface with an adhesive;

completely covering the art with the impermeable layer having the adhesive against the art so that the art adheres to the impermeable layer;

removing the art and impermeable layer from the non-stick panel;

placing the adhesive of the impermeable layer against a skin so the art is against the skin and the adhesive adheres to the skin around the art for a predetermined length of time;

without adding any additional liquid, a perspiration from the skin is held in an absorbent layer;

the perspiration trapped against the skin by the impermeable layer carries the art onto the skin where the art is absorbed onto the skin resulting in the temporary tattoo.

3. A process for making a temporary tattoo comprised of:

imposing an art upon a surface of a non-stick panel;

a first permeable layer is completely covered on a bottom surface with a first adhesive;

a second permeable layer is completely covered on a bottom surface with a second adhesive;

an absorbent layer is completely covered on a bottom surface with a third adhesive;

an impermeable layer is completely covered on a bottom surface with a fourth adhesive;

completely covering the art with the first permeable layer having the first adhesive against the art so that the art adheres to the first permeable layer;

completely covering the art with the second permeable layer having the second adhesive against the first permeable layer so that the second permeable layer adheres to the first permeable layer;

completely covering the art with the absorbent layer having the third adhesive against the second permeable layer so that the absorbent layer adheres to the second permeable layer;

completely covering the art with the impermeable layer having the fourth adhesive against the absorbent layer so that the impermeable layer adheres to the absorbent layer;

removing the art, first permeable layer, second permeable layer, absorbent layer and impermeable layer from the non-stick panel;

placing the first adhesive of the first permeable layer against a skin so the art is against the skin and the first adhesive adheres to the skin around the art for a predetermined length of time;

without adding any additional liquid, a perspiration from the skin can pass through the first permeable layer and the second permeable layer and is held in the absorbent layer;

the perspiration held by the absorbent layer carries the art onto the skin where the art is absorbed onto the skin resulting in the temporary tattoo.

* * * * *